US012327907B2

(12) United States Patent
Wu et al.

(10) Patent No.: US 12,327,907 B2
(45) Date of Patent: Jun. 10, 2025

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Sheng-Chin Hsu, Taipei (TW); Chih-Wei Liao, Taipei (TW); Hau Yuen Tan, Taipei (TW); Cheng-Hsiung Wu, Taipei (TW); Shih-Keng Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 157 days.

(21) Appl. No.: 18/464,184

(22) Filed: Sep. 8, 2023

(65) Prior Publication Data

US 2024/0145898 A1 May 2, 2024

(30) Foreign Application Priority Data

Oct. 26, 2022 (TW) ................................ 111140661

(51) Int. Cl.
*H01Q 1/22* (2006.01)
*H01Q 1/48* (2006.01)
*H01Q 5/40* (2015.01)

(52) U.S. Cl.
CPC ................ *H01Q 1/22* (2013.01); *H01Q 1/48* (2013.01); *H01Q 5/40* (2015.01)

(58) Field of Classification Search
CPC ............ H01Q 5/40; H01Q 1/48; H01Q 1/243
See application file for complete search history.

(56) References Cited

U.S. PATENT DOCUMENTS

| | | | |
|---|---|---|---|
| 8,896,487 B2 | 11/2014 | Chiang et al. | |
| 10,756,415 B2 * | 8/2020 | Wu .......................... | H01Q 9/42 |
| 2004/0257283 A1 | 12/2004 | Asano et al. | |

FOREIGN PATENT DOCUMENTS

| | | |
|---|---|---|
| TW | 201223407 | 6/2012 |
| TW | 201703350 | 1/2017 |

* cited by examiner

*Primary Examiner* — Monica C King
(74) *Attorney, Agent, or Firm* — J.C. PATENTS

(57) ABSTRACT

An electronic device including a metal casing and at least one antenna module is provided. The metal casing includes at least one window. The at least one antenna module is disposed in the at least one window. The at least one antenna module includes a first radiator and a second radiator. The first radiator includes a feeding end, a first ground end joined to the metal casing, a second ground end, a first portion extending from the feeding end to the first ground end, and a second portion extending from the feeding end to the second ground end. A first coupling gap is between the second radiator and the first portion. A second coupling gap is between at least part of the second radiator and the metal casing, and the second radiator includes a third ground end joined to the metal casing.

10 Claims, 11 Drawing Sheets

ELECTRONIC DEVICE

CROSS-REFERENCE TO RELATED APPLICATION

This application claims the priority benefit of Taiwan application serial no. 111140661, filed on Oct. 26, 2022. The entirety of the above-mentioned patent application is hereby incorporated by reference herein and made a part of this specification.

BACKGROUND

Technology Field

This disclosure relates to an electronic device, in particular to an electronic device having an antenna module with broadband characteristics.

Description of Related Art

An antenna module of a conventional electronic device is disposed inside an all-metal casing and is interfered by the all-metal casing, which results in the antenna module not having good broadband characteristics. Therefore, how to enable an antenna module to have good broadband characteristics is an urgent issue to be solved in this field.

SUMMARY

The disclosure provides an electronic device, and an antenna module thereof with good broadband antenna characteristics.

The electronic device of the disclosure includes a metal casing and at least one antenna module. The metal casing includes at least one window. The at least one antenna module is disposed inside the at least one window. The at least one antenna module includes a first radiator and a second radiator. The first radiator includes a feeding end, a first ground end joined to the metal casing, a second ground end, a first portion extending from the feeding end to the first ground end, and a second portion extending from the feeding end to the second ground end. A first coupling gap is between the second radiator and the first portion. A second coupling gap is between at least part of the second radiator and the metal casing, and the second radiator includes a third ground end joined to the metal casing.

In an embodiment of the disclosure, the second portion includes a first subportion, a second subportion, and a third subportion sequentially connected. The first subportion is connected to the feeding end. The second subportion is connected to the second ground end. The third subportion extends from the second subportion and is parallel to the first subportion. A third coupling gap is between the first subportion and the third subportion. A fourth coupling gap is between the third subportion and the metal casing.

In an embodiment of the disclosure, the metal casing includes a first edge, a second edge, a third edge, and a fourth edge surrounding the window and sequentially connected. The first ground end is joined to the first edge. The second ground end and the third ground end are joined to the third edge. The second coupling gap is between the second radiator and the second edge.

In an embodiment of the disclosure, the second subportion is joined to the fourth edge.

In an embodiment of the disclosure, the second portion, the third coupling gap, and the fourth coupling gap are excited at a first high-frequency band. The first subportion and the second subportion are excited at a second high-frequency band. The first portion is excited at a third high-frequency band. The first portion, the second radiator, and the second coupling gap are excited at a fourth high-frequency band.

In an embodiment of the disclosure, the second radiator includes a notch facing the second portion near the third ground end to form a fifth coupling gap.

In an embodiment of the disclosure, the first radiator, the first coupling gap, the second radiator, and the fifth coupling gap are excited at a low-frequency band.

In an embodiment of the disclosure, the metal casing includes at least one antenna cavity recessed on an outer surface. An opening of the at least one antenna cavity forms the at least one window. The at least one antenna module is disposed in the at least one antenna cavity.

In an embodiment of the disclosure, the at least one antenna module includes multiple antenna modules. The at least one antenna cavity includes multiple antenna cavities. The antenna cavities are not communicated with each other. The antenna modules are disposed in the respective antenna cavities.

In an embodiment of the disclosure, a distance between adjacent two of the antenna modules is between 5 mm and 25 mm.

Based on the above, the antenna module of the electronic device of the disclosure radiates at the high-frequency band and the low-frequency band through multiple radiation paths formed by the first radiator and the second radiator joined to the metal casing, so that the antenna module has good broadband antenna characteristics. Since the antenna module is disposed on (the inside of) the notch inside the window of the metal casing and is not covered by the metal casing, the antenna module may be prevented from being shielded by the metal casing and having the antenna characteristics affected.

DESCRIPTION OF THE EMBODIMENTS

Figure 1:
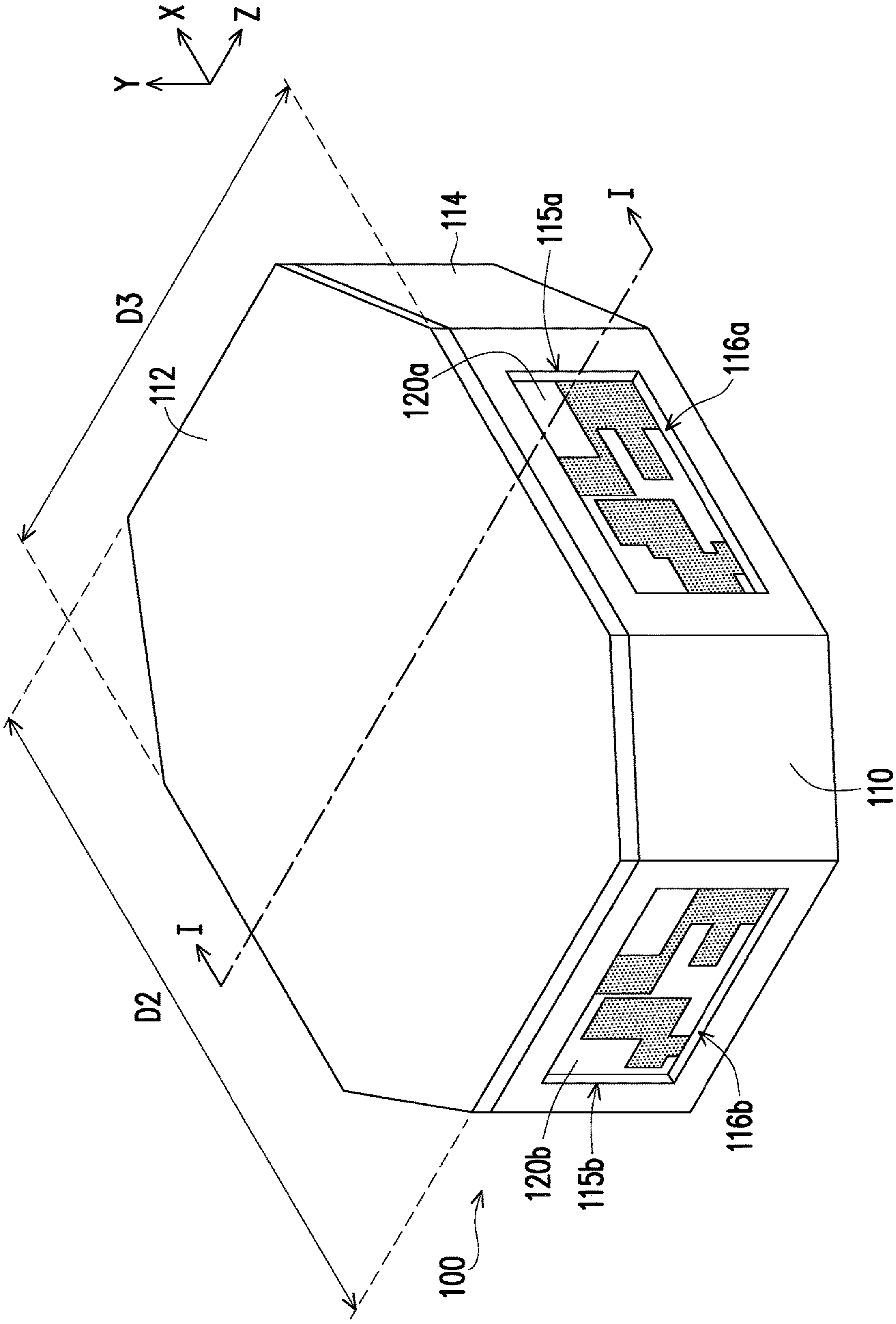
FIG. 1 is a schematic diagram of an electronic device according to an embodiment of the disclosure.
Figure 2:
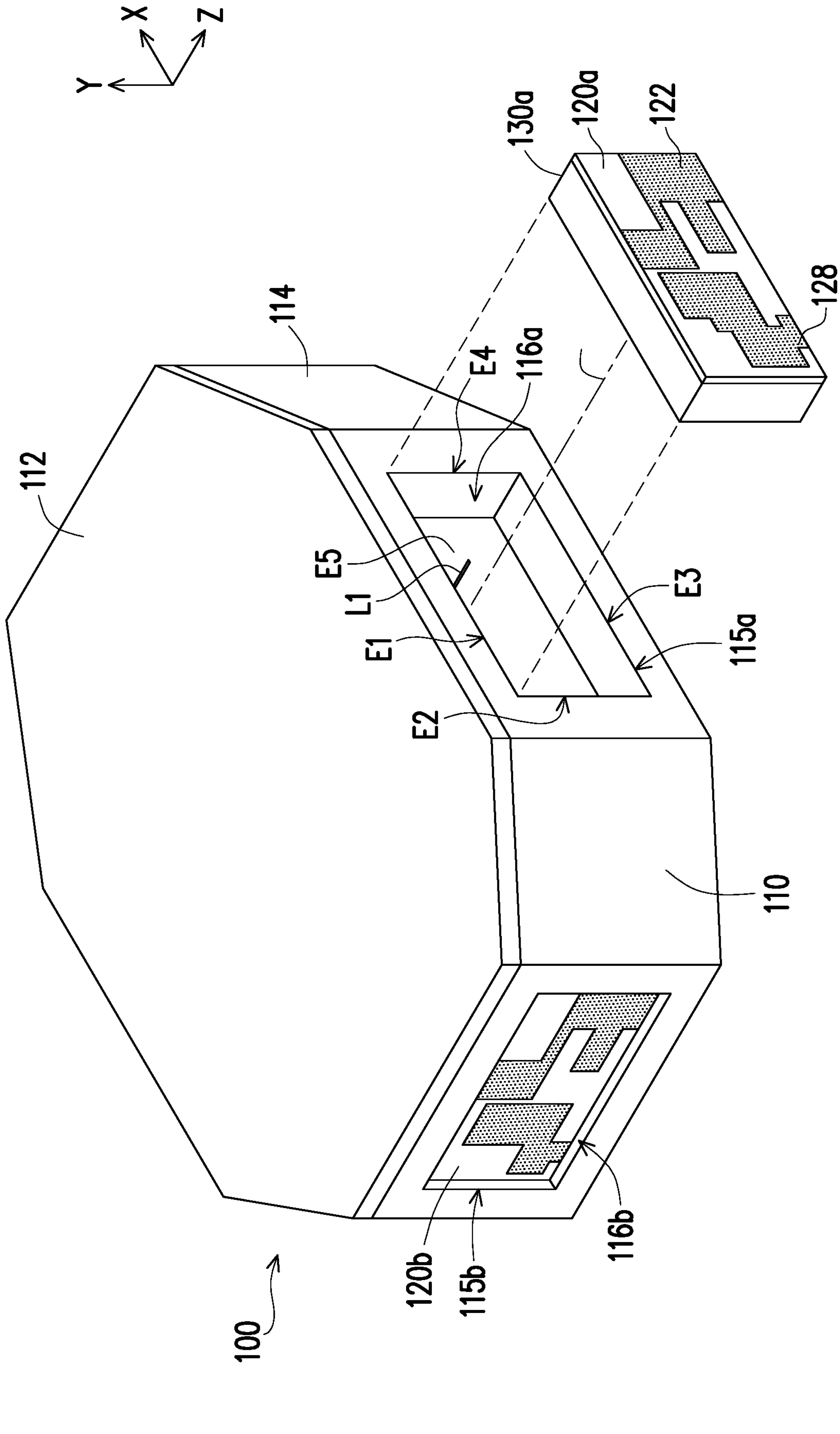
FIG. 2 is a schematic diagram of some elements of FIG. 1 separated from a metal casing.
Figure 3:
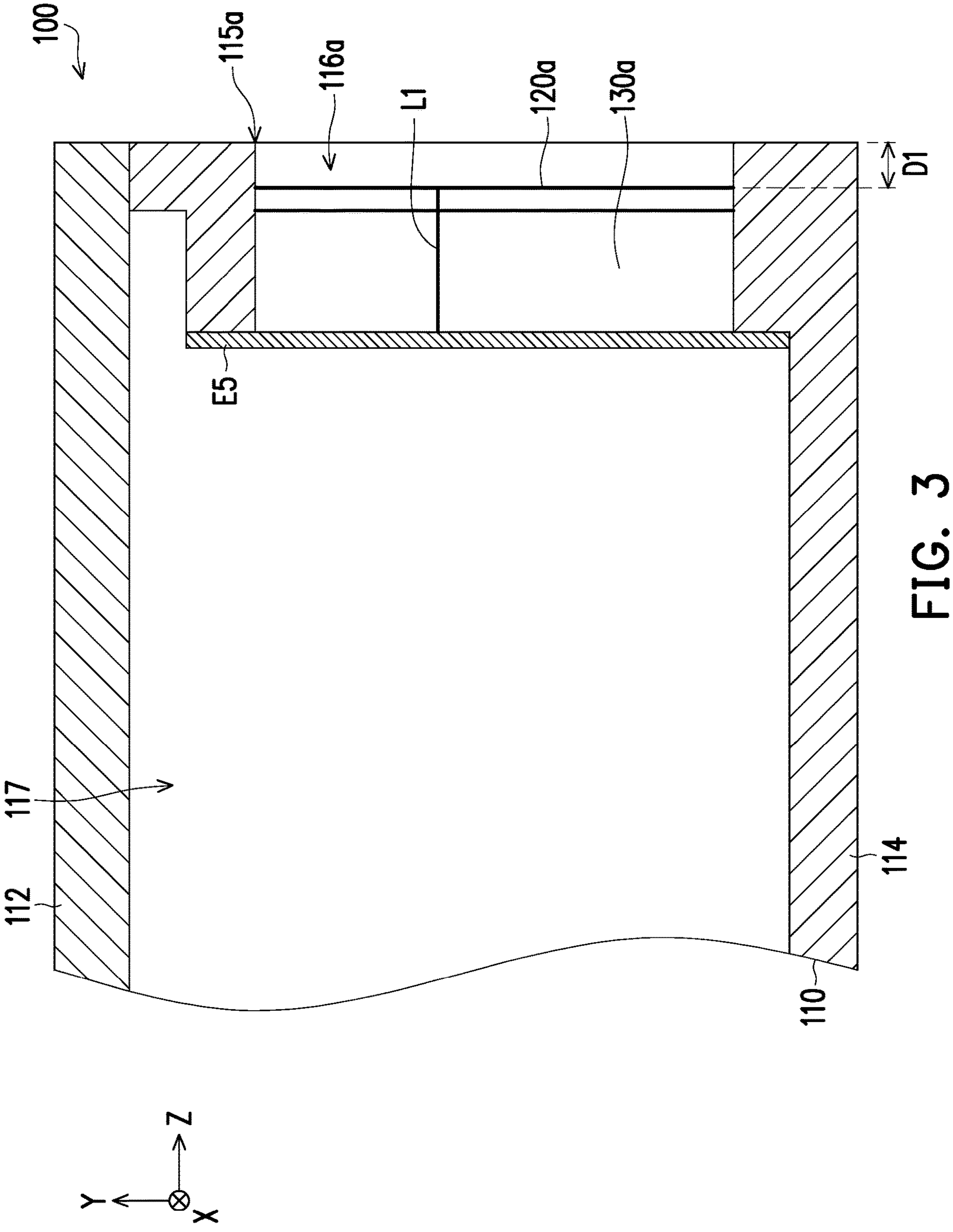
FIG. 3 is a cross-sectional view of the electronic device of FIG. 1 along a line I-I.

FIG. 1 is a schematic diagram of an electronic device according to an embodiment of the disclosure. FIG. 2 is a schematic diagram of some elements of FIG. 1 separated from a metal casing. An antenna module 120*a* and a bracket 130*a* are separated from a metal casing 110. FIG. 3 is a cross-sectional view of the electronic device of FIG. 1 along a line I-I. Coordinates X-Y-Z are added to the diagrams to facilitate the description of components.

Please refer to FIG. 1 to FIG. 3 together. An electronic device 100 includes the metal casing 110, at least one antenna module, and at least one bracket 130*a* (FIG. 2). The metal casing 110 includes a body 114 and a cover 112 disposed on the body 114. The metal casing 110 of this embodiment is octagonal, but not limited thereto. For example, the metal casing 110 may be circular, quadrilateral, or any polygon.

The body 114 of the metal casing 110 includes at least one antenna cavity corresponding to the at least one antenna module. An opening of the at least one antenna cavity forms at least one window. The antenna module is disposed on the corresponding bracket 130*a*, and the antenna module is disposed inside the corresponding window and is disposed in the corresponding antenna cavity. Here, the at least one antenna module includes two antenna modules 120*a* and 120*b*, and the electronic device 100 includes two corresponding brackets 130*a* (only one bracket 130*a* is schematically shown here), two antenna cavities 116*a* and 116*b*, and two windows 115*a* and 115*b*, but not limited thereto.

The two antenna cavities 116*a* and 116*b* are not communicated with each other, so as to prevent the two antenna modules 120*a* and 120*b* from interfering with each other. The metal casing 110 further includes a first edge E1, a second edge E2, a third edge E3, and a fourth edge E4 surrounding the window 115*a* and sequentially connected. The first edge E1 is located above the third edge E3 in the Y-axis direction. The second edge E2 is located on the left side of the fourth edge E4 in the X-axis direction.

As shown in FIGS. 2 and 3, the body 114 and the cover 112 of the metal casing 110 form an accommodating space 117 (FIG. 3) for accommodating multiple electronic elements (not shown). The antenna cavities 116*a* and 116*b* are recessed on an outer surface of the metal casing 110. The accommodating space 117 is separated from the antenna cavity 116*a* by a metal bottom plate E5. The antenna cavity 116*a* and the accommodating space 117 are not communicated with each other. In other words, the antenna cavities 116*a* and 116*b* are isolated from the accommodating space 117 of the metal casing 110. Therefore, the antenna modules 120*a* and 120*b* are not enclosed inside the metal casing 110. That is, the antenna modules 120*a* and 120*b* are not covered by the body 114 and the cover 112 of the metal casing 110.

A distance between adjacent antenna modules 120*a* and 120*b* (FIG. 1) is between 5 mm and 25 mm, more specifically, between 5 mm and 10 mm. The antenna module 120*a* is parallel to an X-Y plane, and the antenna module 120*b* is parallel to a Y-Z plane and is perpendicular to the antenna module 120*a*, but not limited thereto. The two antenna modules 120*a* and 120*b* may also be disposed parallel to each other. Here, a radiation direction of the antenna module 120*a* is parallel to the +Z axis, and a radiation direction of the antenna module 120*b* is parallel to the –X axis.

As shown in FIG. 3, the antenna module 120*a* is separated from the window 115*a* by a distance D1. The antenna modules 120*a* and 120*b* (FIG. 2) may be regarded as being sunk in the metal casing 110. The distance D1 is between 0.5 mm and 1.5 mm, for example, 1 mm. The thickness of the bracket 130*a* in the Z-axis direction is between 5 mm and 6.5 mm, for example, 5.7 mm. In addition, the electronic device 100 may include a plastic member (not shown). The plastic member is disposed on the windows 115*a* and 115*b*. The antenna modules 120*a* and 120*b* are located between the plastic member and the bracket 130*a*. The plastic member works as a protective cover of the antenna modules 120*a* and 120*b*.

The antenna module 120*a* of this embodiment is multi-path grounded (to be described below) through a first radiator 122 and a second radiator 128 (FIG. 2) in combination with the metal casing 110, so that the antenna module has a broadband characteristic and supports Wi-Fi 6E.

Figure 4:
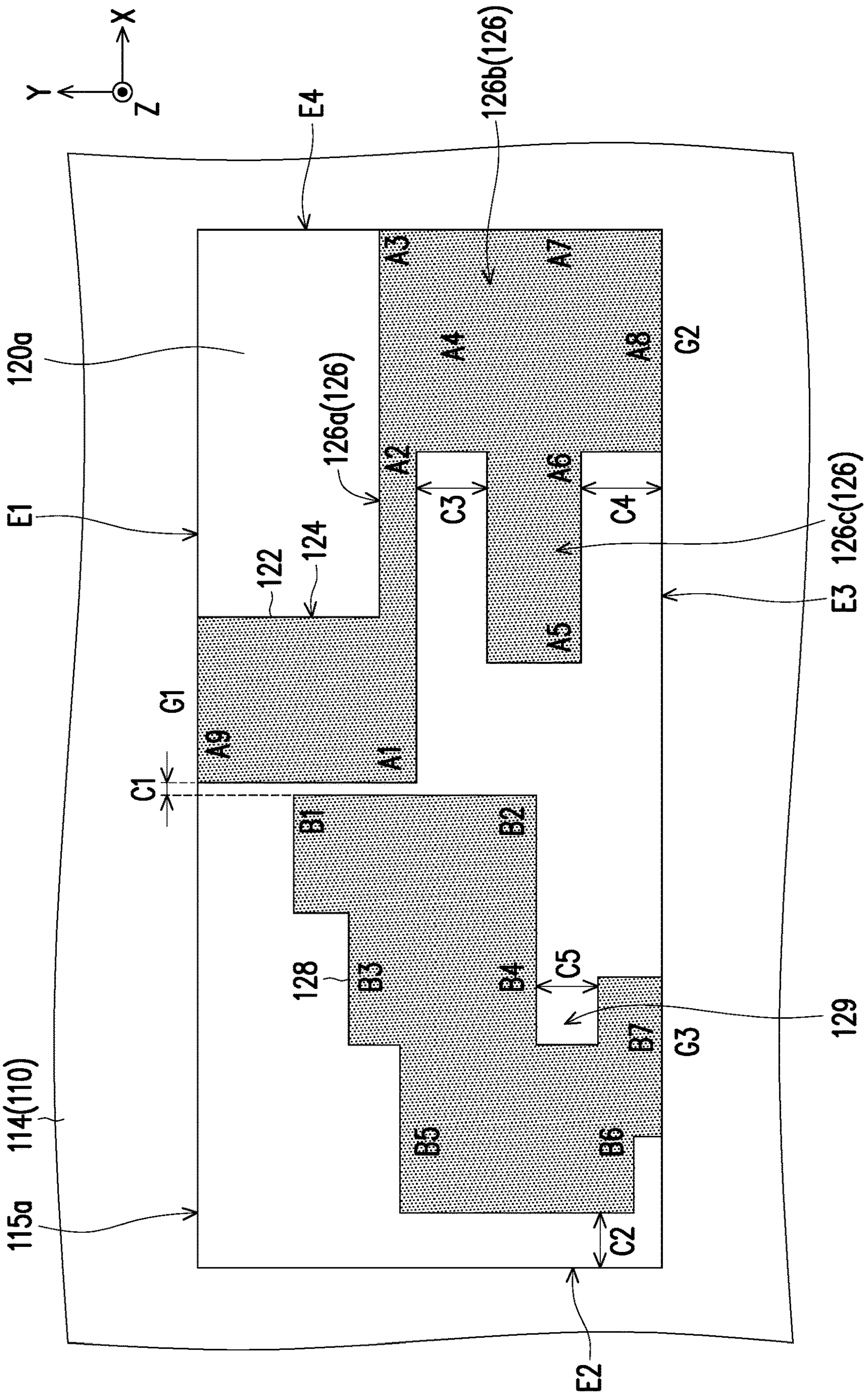
FIG. 4 is a front view of the antenna module of FIG. 1.

FIG. 4 is a front view of the antenna module of FIG. 1. Please refer to FIG. 4. The first radiator 122 (positions A1-A9) of the antenna module 120*a* includes a feeding end located at the position A1, a first ground end (a position G1) joined to the first edge E1 of the metal casing 110, a second ground end (a position G2) joined to the third edge E3 of the metal casing 110, a first portion 124 (the positions A1 and A9) extending from the feeding end (the position A1) to the first ground end (the position G1), and a second portion 126 (the positions A1-A8) extending from the feeding end (the position A1) to the second ground end (the position G2).

A first coupling gap C1 is between the second radiator 128 (positions B1-B7) of the antenna module 120*a* and the first portion 124 (the positions A1 and A9) of the first radiator 122, and a second coupling gap C2 is between the second radiator 128 (the positions B1-B7) and the second edge E2 of the metal casing 110. The first coupling gap C1 is between 0.25 mm and 0.75 mm, such as 0.5 mm. The second coupling gap C2 is between 1.5 mm and 2.5 mm, such as 2 mm.

The second portion 126 (the positions A1-A8) of the first radiator 122 includes a first subportion 126*a* (the positions A1-A3), a second subportion 126*b* (the positions A4, A7, and A8), and a third subportion 126*c* (the positions A5 and A6) sequentially connected. The first subportion 126*a* (the positions A1-A3) is connected to the feeding end (the position A1), the second subportion 126*b* (the positions A4, A7, and A8) is connected to the second ground end (the position G2) and is also joined to the fourth edge E4, and the third subportion 126*c* (the position A5 and A6) extends from the second subportion 126*b* and is parallel to the first subportion 126*a*.

A third coupling gap C3 is between the first subportion 126*a* (the positions A1-A3) and the third subportion 126*c* (the positions A5 and A6). A fourth coupling gap C4 is between the third subportion 126*c* (the positions A5 and A6) and the metal casing 110. The third coupling gap C3 is between 2 mm and 3 mm, for example, 2.5 mm. The fourth coupling gap C4 is between 2.5 mm and 3.5 mm, for example, 3 mm.

In addition, the second radiator 128 (the positions B1-B7) includes a third ground end (a position G3) joined to the third edge E3 of the metal casing 110. The second radiator 128 (the positions B1-B7) includes a notch 129 facing the second portion 126 near the third ground end (the position G3). As shown in FIG. 4, the positions B4, B6, and B7 of the second radiator 128 are roughly U-shaped to form the notch 129. The notch 129 forms a fifth coupling gap C5. The fifth coupling gap C5 is between 1.5 mm and 2.5 mm, for example, 2 mm.

The user may adjust the sizes of the first coupling gap C1, the second coupling gap C2, the third coupling gap C3, the fourth coupling gap C4, and the fifth coupling gap C5 by adjusting the areas of the first radiator 122 (the positions A1-A9) and the second radiator 128 (the positions B1-B7).

In addition, as shown in FIG. 2 and FIG. 3, the electronic device 100 further includes a coaxial transmission cable L1.

The coaxial transmission cable L1 passes through the metal bottom plate E5 and enters the antenna cavity 116*a*. The feeding end (the position A1) of the antenna module 120*a* of FIG. 4 is electrically connected to a positive signal end of the coaxial transmission cable L1. The first ground end (the position G1), the second ground end (the position G2), and the third ground end (the position G3) are electrically connected to a negative signal end of the coaxial transmission cable L1.

The antenna module 120*a* has multiple high-frequency radiation paths and a low-frequency radiation path to be excited at multiple high-frequency bands and a low-frequency band. Specifically, as shown in FIG. 4, a first high-frequency radiation path is the path from the feeding end (the position A1) through the second portion 126 (the positions A1-A8) of the first radiator 122 to the second ground end (the position G2). The second portion 126 (the positions A5 and A6) of the first radiator 122, the third coupling gap C3, and the fourth coupling gap C4 are excited at a first high-frequency band. The first high-frequency band is between 4950 MHz and 5150 MHz.

A second high-frequency radiation path is the path from the feeding end (the position A1) through the second portion 126 (the positions A1-A8) of the first radiator 122 to the second ground end (the position G2), thereby being excited at a second high-frequency band. The second high-frequency band is between 5150 MHz and 6100 MHz.

A third high-frequency radiation path is the path from the feeding end (the position A1) through the first portion 124 (the positions A1 and A9) of the first radiator 122 to the first ground end (the position G1), thereby being excited at a third high-frequency band. The third high-frequency band is between 6100 MHz and 7100 MHz. In addition, the path from the first radiator 122 (the positions A1-A9) to the first ground end (the position G1), the path from the second radiator 128 (the positions B1-B7) to the third ground end (the position G3), and the second coupling gap C2 may be excited at a fourth high-frequency band. The fourth high-frequency band is between 7100 MHz and 7600 MHz. Besides, a position of a center frequency of the fourth high-frequency band can be adjusted by adjusting the distance of the second coupling gap C2.

The antenna module 120*a* further includes a low-frequency radiation path. The low-frequency radiation path is the path from the first radiator 122 (the positions A1-A9) to the first ground end (the position G1), the second portion 126 (the positions A1-A8) to the second ground end (the position G2), and the first coupling gap C1, the fifth coupling gap C5, and the second radiator 128 (the positions B1-B7) connected to the third ground end (the position G3), thereby being excited at the low-frequency band. The low-frequency band is between 2400 MHz and 2500 MHz. The center frequency of the low-frequency band may be adjusted by adjusting the size of the fifth coupling gap C5.

Figure 5:
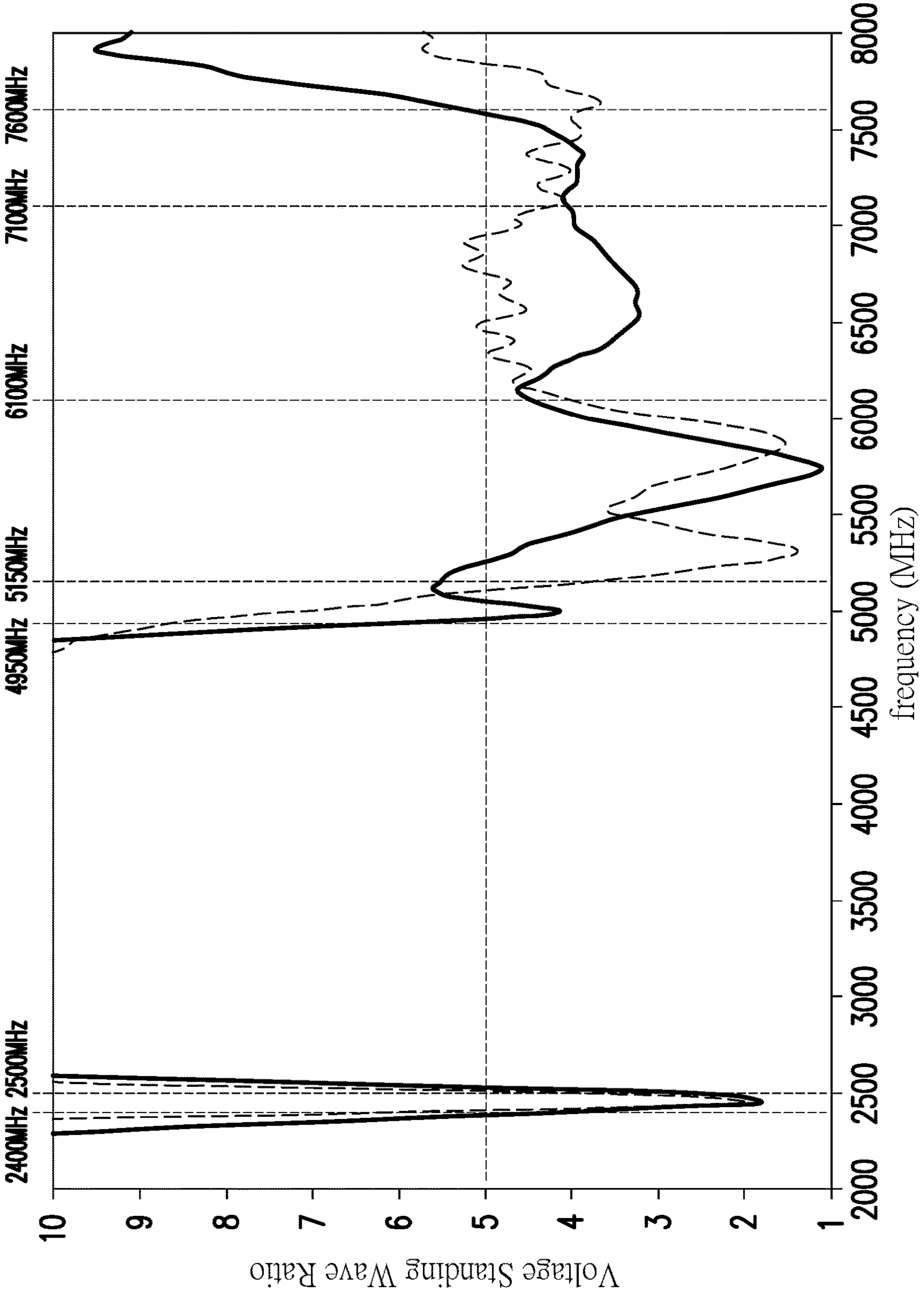
FIG. 5 is a diagram of relationships between frequency and voltage standing wave ratio of the two antenna modules of FIG. 1.

FIG. 5 is a diagram of relationships between frequency and voltage standing wave ratio of the two antenna modules of FIG. 1. The solid line represents the relationship between the frequency and the voltage standing wave ratio (VSWR) of the antenna module 120*a* (FIG. 1), and the dotted line represents the relationship between the frequency and the voltage standing wave ratio of the antenna module 120*b* (FIG. 1).

Referring to FIG. 5, the voltage standing wave ratio values of the low-frequency band (2400 MHz to 2500 MHz), the first high-frequency band (4950 MHz to 5150 MHz), the second high-frequency band (5150 MHz to 6100 MHz), the third high-frequency band (6100 MHz to 7100 MHz), and the fourth high-frequency band (7100 MHz to 7600 MHz) of the antenna module 120*a* are all below 5. The antenna module 120*a* has good performance.

Due to differences in the placement positions (FIG. 1) and the measurement positions of frequency and voltage standing wave ratio of the antenna module 120*a* and the antenna module 120*b*, in the above-mentioned frequency ranges, frequency and voltage standing wave ratio of the antenna module 120*a* (the solid line) and the antenna module 120*b* (the dotted line) are slightly different. However, the antenna module 120*b* still has good performance.

Figure 6:
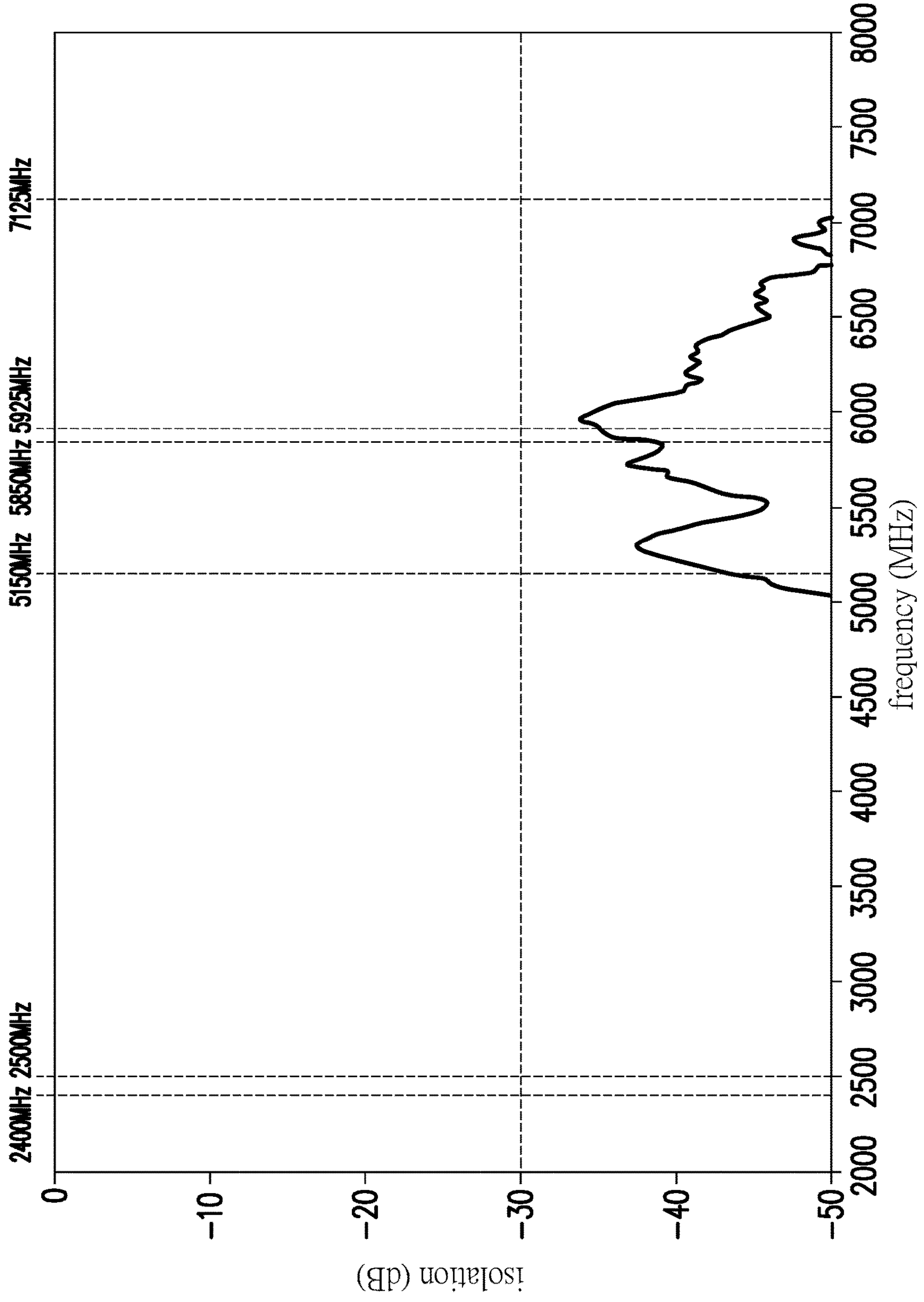
FIG. 6 is a diagram of relationships between frequency and isolation of the two antenna modules of FIG. 1.

FIG. 6 is a diagram of relationships between frequency and isolation of the two antenna modules of FIG. 1. Referring to FIG. 6, in the frequency range of 5150 MHz to 7125 MHz, isolation between the two antenna modules 120*a* and 120*b* is good, which is greater than −30 dB. It may be seen that the two antenna cavities 116*a* and 116*b* of this embodiment are independently disposed to effectively block the interference of the adjacent antenna modules 120*a* and 120*b*. Therefore, the user may install more antenna modules to improve the transmission efficiency, so that the electronic device 100 has a multi-input multi-output (MIMO) multi-antenna configuration.

In addition, due to the good isolation between the two antenna modules 120*a* and 120*b*, no additional isolation elements need to be disposed between the two antenna cavities 116*a* and 116*b*, which can improve the space utilization efficiency of the electronic device 100 and reduce the overall volume of the electronic device 100, so that the electronic device 100 is suitable for small military standard monitoring devices.

For example, as shown in FIG. 1, the total length of a long side D2 (X-axis direction) of the electronic device 100 of this embodiment is 97.5 mm, the total length of a short side D3 (Z-axis direction) is 75 mm, and the height (Y-axis direction) is 30.5 mm.

Figure 7:
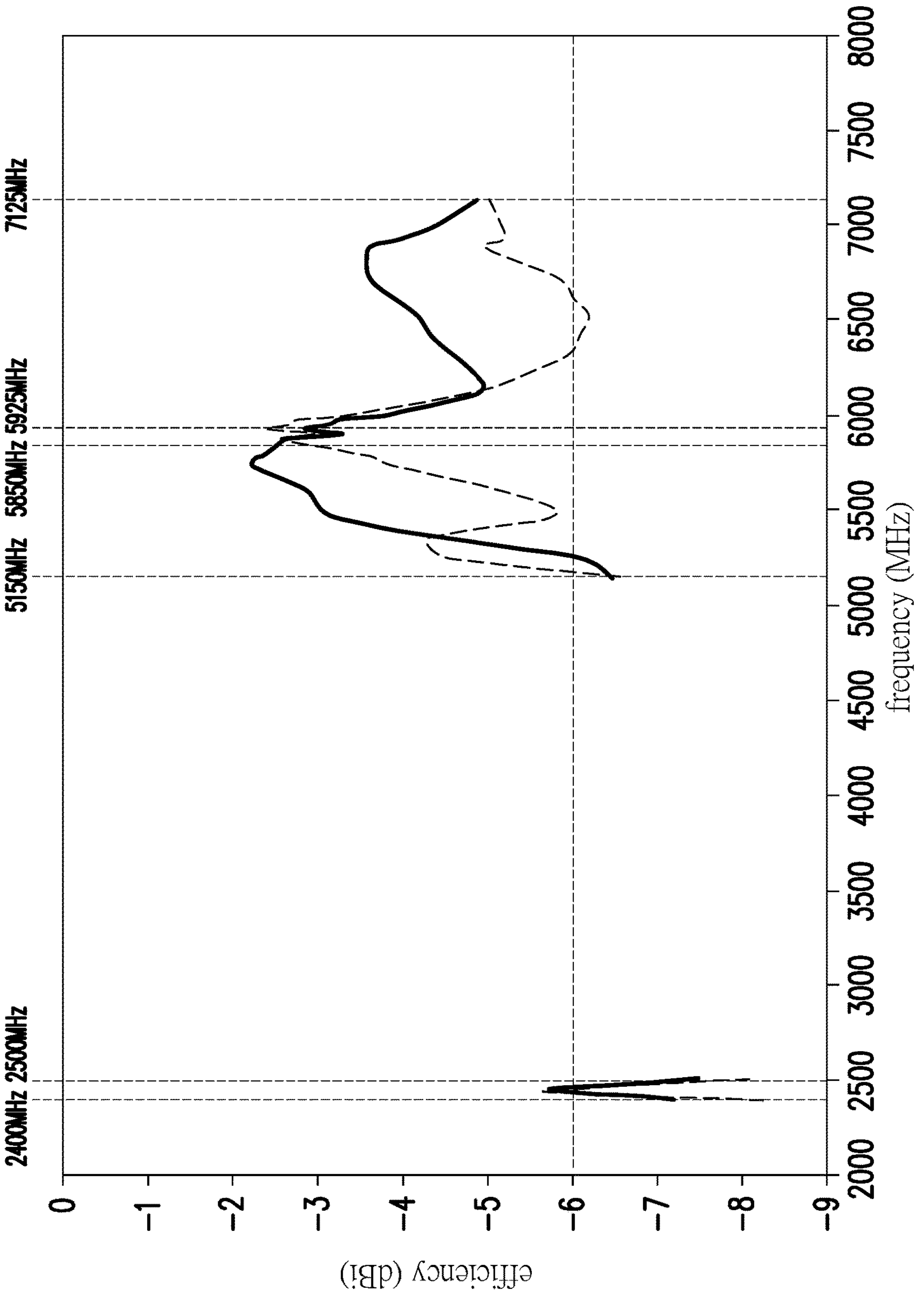
FIG. 7 is a diagram of relationships between frequency and efficiency of the two antenna modules of FIG. 1.

FIG. 7 is a diagram of relationships between frequency and efficiency of the two antenna modules of FIG. 1. The solid line represents the relationship between the frequency and the efficiency of the antenna module 120*a*. The dotted line represents the relationship between the frequency and the efficiency of the antenna module 120*b*.

Referring to FIG. 7, for the two antenna modules 120*a* and 120*b*, the efficiency in the low-frequency range of 2400 MHz to 2500 MHz is between −5.6 dBi and −8.3 dBi, the efficiency in the high-frequency range of 5150 MHz to 5850 MHz is between −2.3 dBi and −6.6 dBi, and the efficiency in the high-frequency range of 5925 MHz to 7125 MHz is between −2.4 dBi and −6.2 dBi. It may be seen that the antenna modules 120*a* and 120*b* both have a good efficiency performance.

The bracket 130*a* illustrated in FIG. 2 is only an example. The specific structures of brackets 130*b* and 130*c* of the disclosure will be described in an illustrative way below with reference to FIGS. 8 to 11.

Figure 8:
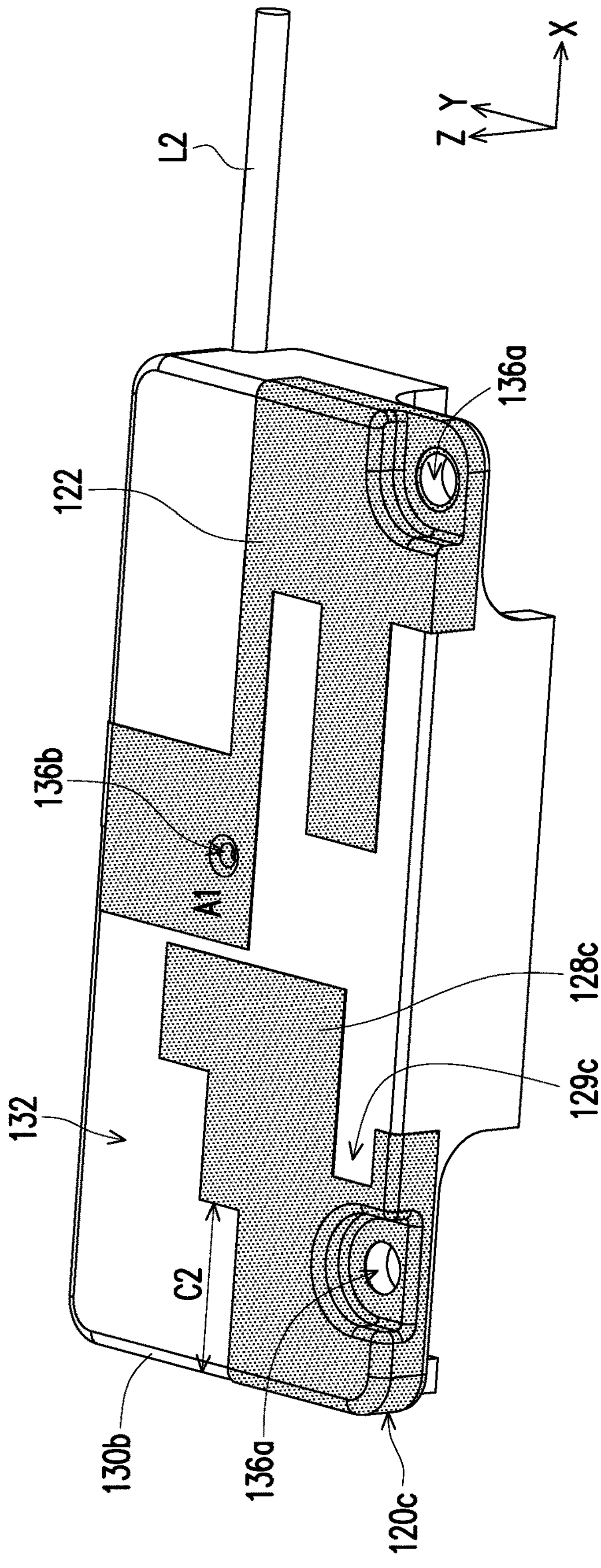
FIG. 8 is a schematic diagram of a bracket and an antenna module according to another embodiment of the disclosure.
Figure 9:
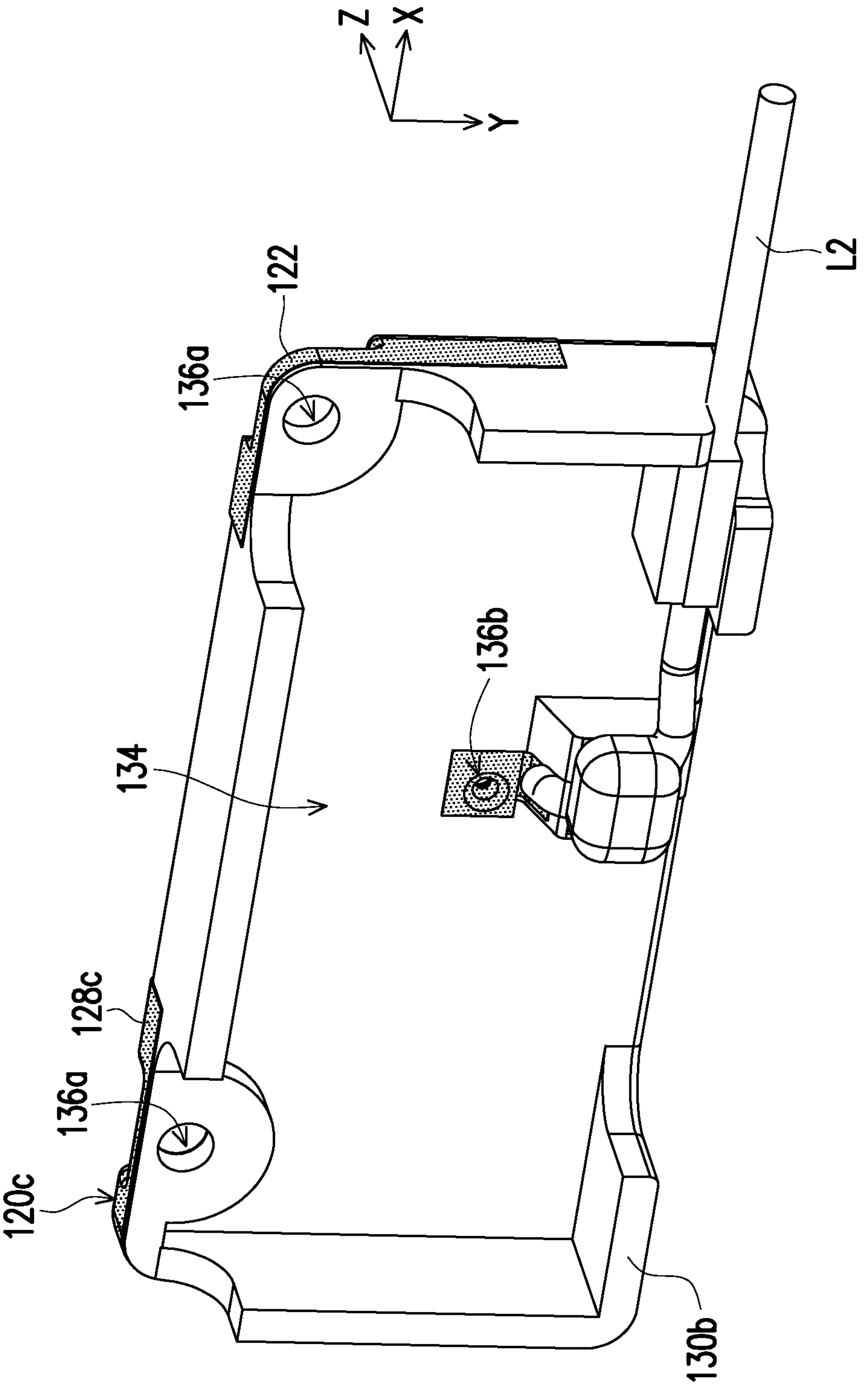
FIG. 9 is a schematic diagram of the bracket and the antenna module of FIG. 8 from another perspective.

FIG. 8 is a schematic diagram of a bracket and an antenna module according to another embodiment of the disclosure. FIG. 9 is a schematic diagram of the bracket and the antenna module of FIG. 8 from another perspective. Please refer to FIG. 8 and FIG. 9 together. The bracket 130*b* includes a first surface 132 and a second surface 134 (FIG. 9). An antenna module 120*c* may be printed on the first surface 132 and the second surface 134 of the bracket 130*b* through laser direct structuring (LDS), but not limited thereto. The thickness of the bracket 130*b* in the Z-axis direction is, for example, 5.7 mm.

As shown in FIG. 8, the bracket 130*b* includes two vias 136*a* disposed corresponding to the second ground end (the position G2) and the third ground end (the position G3) of FIG. 4, so that the second ground end (the position G2) and the third ground end (the position G3) may be joined to the metal casing 110 (FIG. 1) through a fastener (not shown). The electronic device 100 may further include a conductive foam (not shown), and the first ground end (the position G1) may be joined to the metal casing 110 through the conductive foam.

As shown in FIGS. 8 and 9, the bracket 130*b* further includes a via 136*b* corresponding to the feeding end (the position A1) of the antenna module 120*c*. A coaxial transmission cable L2 (FIG. 9) is fixed on the second surface 134 of the bracket 130*b* and is electrically connected to the feeding end (the position A1 of FIG. 8) on the first surface 132 through the via 136*b*.

In addition, please refer to FIGS. 4 and 8 together. The antenna module 120*c* of this embodiment is similar to the antenna module 120*a* of the above-mentioned embodiment, and the difference between the two is: when the bracket 130*b* is disposed on the window 115*a* (FIG. 2), a part of a second radiator 128*c* of the antenna module 120*c* of this embodiment is joined to the second edge E2 (FIG. 2) of the metal casing 110, and the second coupling gap C2 is between another part of the second radiator 128*c* and the second edge E2. The antenna module 120*c* includes a U-shaped notch 129*c*. The antenna module 120*c* of this embodiment has a similar effect to that of the above embodiment and will not be repeated in the following.

Figure 10:
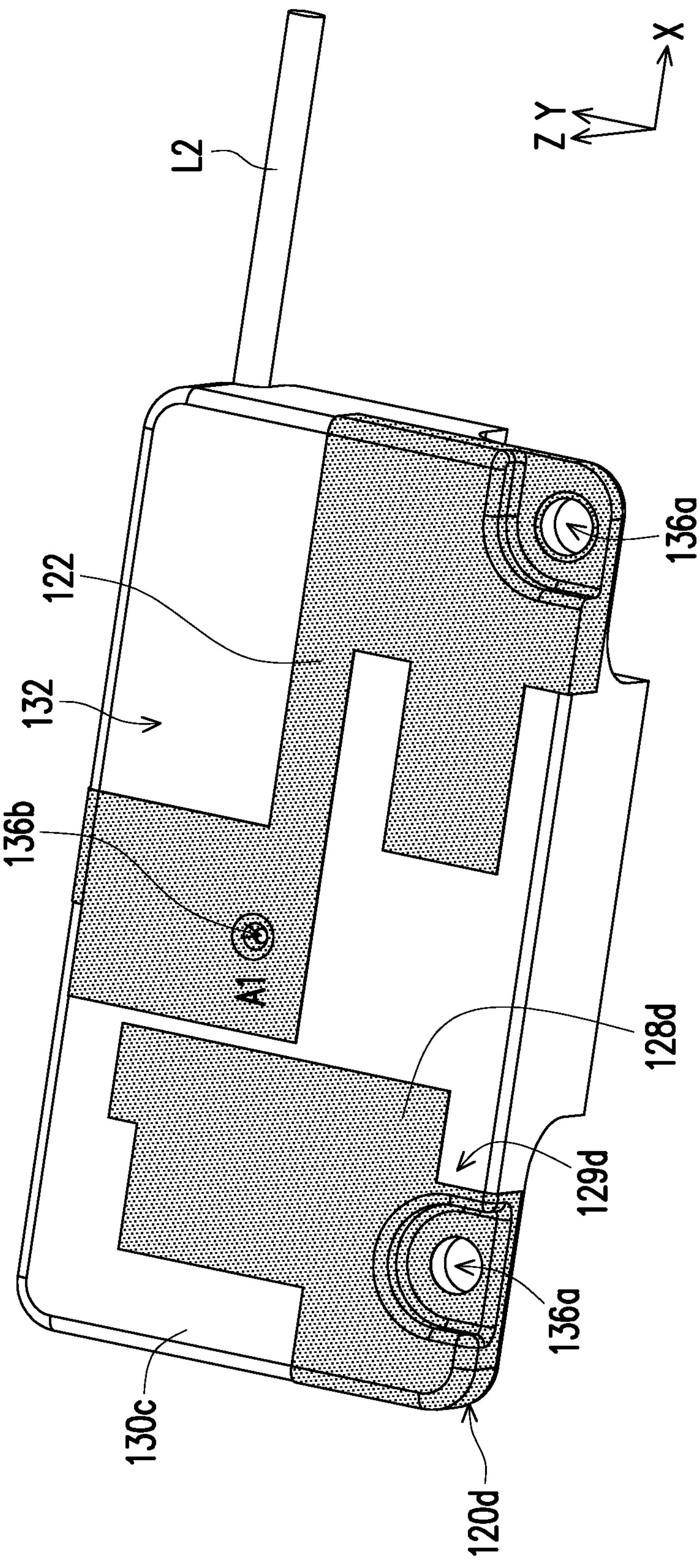
FIG. 10 is a schematic diagram of a bracket and an antenna module according to another embodiment of the disclosure.
Figure 11:
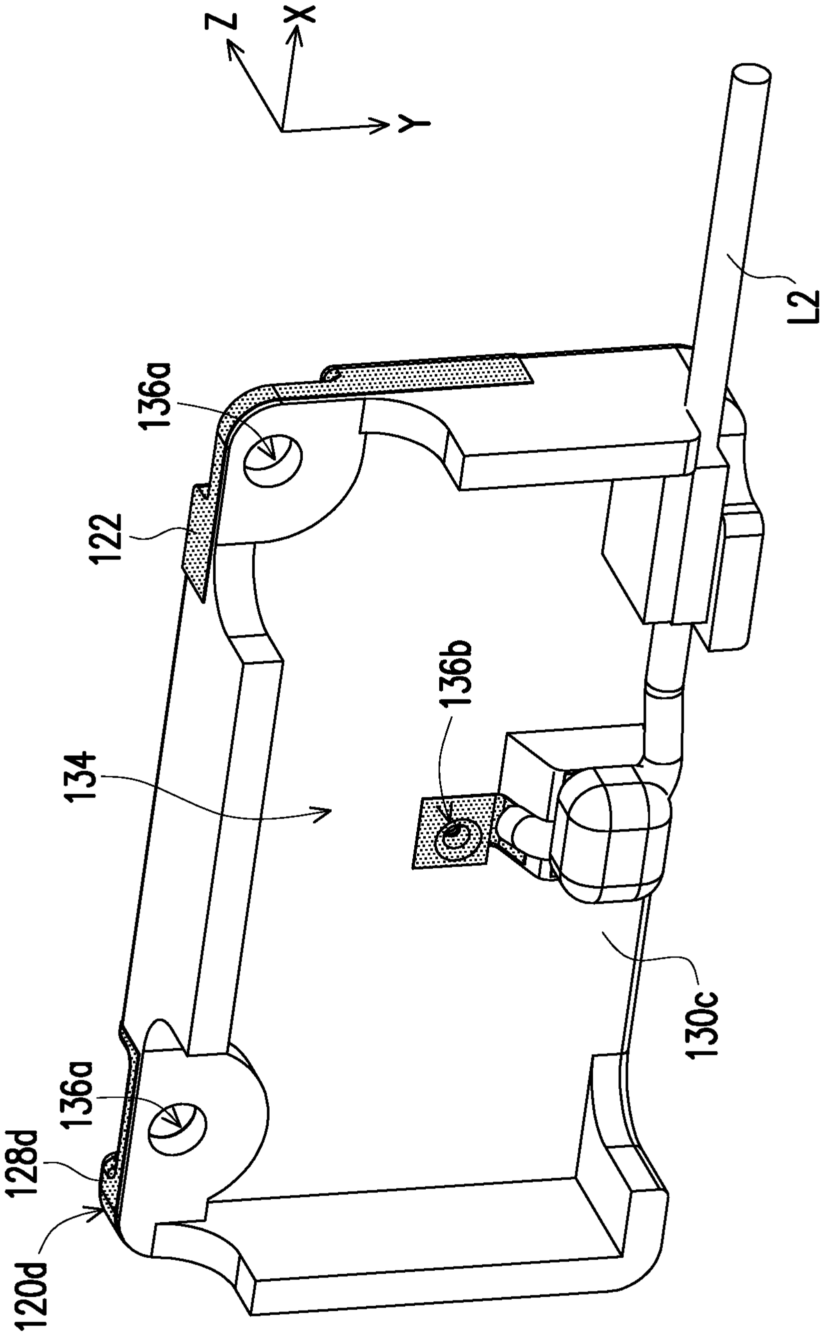
FIG. 11 is a schematic diagram of the bracket and the antenna module of FIG. 10 from another perspective.

FIG. 10 is a schematic diagram of a bracket and an antenna module according to another embodiment of the disclosure. FIG. 11 is a schematic diagram of the bracket and the antenna module of FIG. 10 from another perspective. Please refer to FIGS. 8, 10, and 11 together. An antenna module 120*d* of this embodiment is similar to the above embodiment, and the difference between the two is: a notch 129*d* of this embodiment is roughly L-shaped. When the bracket 130*c* is disposed on the window 115*a* (FIG. 2), the notch 129*d* is located between a second radiator 128*d* and the third edge E3 of the metal casing 110 (FIG. 2). The antenna module 120*d* of this embodiment has a similar effect to that of the above embodiment and will not be repeated in the following. The user may set the antenna modules 120*a*, 120*b*, 120*c*, and 120*d* and the brackets 130*a*, 130*b*, and 130*c* in the metal casing 110 according to requirements.

To sum up, the antenna module of the electronic device of the disclosure radiates multiple high-frequency bands and a low-frequency band through multiple radiation paths joined by the first radiator and the second radiator to the metal casing, so that the antenna module has good broadband characteristics. Since the antenna module is disposed inside the window on the outer surface of the metal casing and is not enclosed by the metal casing, the antenna module may be prevented from being shielded by the metal casing and having the antenna characteristics affected.

The antenna module is suitable for a Wi-Fi 6E broadband antenna and may be excited at the first high-frequency band, the second high-frequency band, the third high-frequency band, the fourth high-frequency band, and the low-frequency band. The first high-frequency band is between 4950 MHz and 5150 MHz. The second high-frequency band is between 5150 MHz and 6100 MHz. The third high-frequency band is between 6100 MHz and 7100 MHz. The fourth high-frequency band is between 7100 MHz and 7600 MHz. The low-frequency band is between 2400 MHz and 2500 MHz. When the electronic device includes two antenna modules, the two antenna modules are disposed in two independent and isolated antenna cavities to prevent the two antenna modules from interfering with each other. According to the test results, the two antenna modules have good isolation between each other and have good voltage standing wave ratio and good efficiency in the low-frequency band and the high-frequency bands.

What is claimed is:

1. An electronic device, comprising:

a metal casing comprising at least one window; and at least one antenna module disposed inside the at least one window, wherein the at least one antenna module comprises:

a first radiator comprising a feeding end, a first ground end joined to the metal casing, a second ground end, a first portion extending from the feeding end to the first ground end, and a second portion extending from the feeding end to the second ground end; and a second radiator, wherein a first coupling gap is between the second radiator and the first portion, a second coupling gap is between at least part of the second radiator and the metal casing, and the second radiator comprises a third ground end joined to the metal casing.

2. The electronic device according to claim 1, wherein the second portion comprises a first subportion, a second subportion, and a third subportion sequentially connected, the first subportion is connected to the feeding end, the second subportion is connected to the second ground end, the third subportion extends from the second subportion and is parallel to the first subportion, a third coupling gap is between the first subportion and the third subportion, and a fourth coupling gap is between the third subportion and the metal casing.

3. The electronic device according to claim 2, wherein the metal casing comprises a first edge, a second edge, a third edge, and a fourth edge surrounding the at least one window and sequentially connected, the first ground end is joined to the first edge, the second ground end and the third ground end are joined to the third edge, and the second coupling gap is between the second radiator and the second edge.

4. The electronic device according to claim 3, wherein the second subportion is joined to the fourth edge.

5. The electronic device according to claim 2, wherein the second portion, the third coupling gap, and the fourth coupling gap are excited at a first high-frequency band, the first subportion and the second subportion are excited at a second high-frequency band, the first portion is excited at a third high-frequency band, and the first portion, the second radiator, and the second coupling gap are excited at a fourth high-frequency band.

6. The electronic device according to claim 1, wherein the second radiator comprises a notch facing the second portion near the third ground end to form a fifth coupling gap.

7. The electronic device according to claim 6, wherein the first radiator, the first coupling gap, the second radiator, and the fifth coupling gap are excited at a low-frequency band.

8. The electronic device according to claim 1, wherein the metal casing comprises at least one antenna cavity recessed on an outer surface, an opening of the at least one antenna cavity forms the at least one window, and the at least one antenna module is disposed in the at least one antenna cavity.

9. The electronic device according to claim 8, wherein the at least one antenna module comprises a plurality of antenna modules, the at least one antenna cavity comprises a plurality of antenna cavities, the antenna cavities are not communicated with each other, and the antenna modules are disposed in the respective antenna cavities.

10. The electronic device according to claim 9, wherein a distance between the two adjacent antenna modules is between 5 mm and 25 mm.

* * * * *